(12) United States Patent
Jasuja et al.

(10) Patent No.: US 11,298,681 B2
(45) Date of Patent: Apr. 12, 2022

(54) UREA-IMPREGNATED ZEOLITE SORBENTS AND METHOD FOR MAKING THE SAME

(71) Applicant: 3M INNOVATIVE PROPERTIES COMPANY, St. Paul, MN (US)

(72) Inventors: Himanshu Jasuja, Woodbury, MN (US); Michael S. Wendland, North St. Paul, MN (US); Michael W. Kobe, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 71 days.

(21) Appl. No.: 16/955,262

(22) PCT Filed: Feb. 26, 2019

(86) PCT No.: PCT/IB2019/051545
§ 371 (c)(1),
(2) Date: Jun. 18, 2020

(87) PCT Pub. No.: WO2019/166949
PCT Pub. Date: Sep. 6, 2019

(65) Prior Publication Data
US 2021/0362128 A1 Nov. 25, 2021

Related U.S. Application Data

(60) Provisional application No. 62/637,072, filed on Mar. 1, 2018.

(51) Int. Cl.
*B01J 20/32* (2006.01)
*B01D 53/02* (2006.01)
(Continued)

(52) U.S. Cl.
CPC .......... *B01J 20/3204* (2013.01); *B01D 53/02* (2013.01); *B01J 20/186* (2013.01);
(Continued)

(58) Field of Classification Search
USPC .......................................................... 502/62
See application file for complete search history.

(56) References Cited

U.S. PATENT DOCUMENTS 4,346,067 A  8/1982  Wachter
5,409,769 A  4/1995  Fukumoto
(Continued)

FOREIGN PATENT DOCUMENTS

GB  2327048  1/1999
JP  S53-009709  1/1978
(Continued)

OTHER PUBLICATIONS

Sugiuta, "Removal of Acetaldehyde by Sepiolite-2-Aminobenzoic Acid Complex from Ambient Air", Clay Science, 1992, vol. 8, No. 5, pp. 257-271.
(Continued)

*Primary Examiner* — Anita Nassiri-Motlagh
(74) *Attorney, Agent, or Firm* — Adrian L. Pishko (57) ABSTRACT

A sorbent suitable for sorbing aldehydes includes acidified zeolite impregnated with a urea-based compound, the acidified zeolite having a pore opening of 5 Å or greater and a molar ratio of silicate to aluminate of at least 1.1:1. The sorbent may be prepared by impregnating acidified zeolite with a solution of a urea-based compound, where the acidified zeolite includes proton counterions. The sorbent may be supported on a filter support to provide an air filter.

15 Claims, 1 Drawing Sheet

(51) Int. Cl.
*B01J 20/18* (2006.01)
*B01J 20/28* (2006.01)

(52) U.S. Cl.
CPC ..... *B01J 20/2808* (2013.01); *B01J 20/28028* (2013.01); *B01J 20/3251* (2013.01); *B01J 20/3255* (2013.01); *B01D 2251/2067* (2013.01); *B01D 2253/1085* (2013.01); *B01D 2253/25* (2013.01); *B01D 2253/308* (2013.01); *B01D 2259/4508* (2013.01)

(56) References Cited

U.S. PATENT DOCUMENTS

| | | | |
|---|---|---|---|
| 6,554,886 | B2 | 4/2003 | Yoshikawa |
| 6,596,909 | B2 | 7/2003 | Nishijima |
| 6,837,917 | B2 | 1/2005 | Karwacki |
| 7,238,332 | B2 | 7/2007 | Feaver |
| 7,955,570 | B2 | 6/2011 | Insley |
| 8,247,346 | B2 | 8/2012 | England |
| 2003/0041735 | A1 | 3/2003 | Yoshikawa |

FOREIGN PATENT DOCUMENTS

| | | |
|---|---|---|
| JP | H11-347109 | 12/1999 |
| JP | 2010-137113 | 6/2010 |
| JP | 2011-083756 | 4/2011 |
| JP | 2011-084850 | 4/2011 |
| JP | 2010-162477 | 7/2020 |
| KR | 2013-0040273 | 4/2013 |
| TW | M523071 | 6/2016 |
| WO | WO 2017-106434 | 6/2017 |
| WO | WO 2017-160650 | 9/2017 |

OTHER PUBLICATIONS

Database WPI Week 197810, Jan. 28, 1978 Thomson Scientific, London, GB; AN 1978-18806A XP002791615, & JP S53 9709 A (TOKIWA DENKI KK) abstract, 2 pages.
International Search Report for PCT International Application No. PCT/IB2019/051545, dated Jun. 7, 2019, 5 pages.

UREA-IMPREGNATED ZEOLITE SORBENTS AND METHOD FOR MAKING THE SAME

CROSS REFERENCE TO RELATED APPLICATIONS

This application is a national stage filing under 35 U.S.C. 371 of PCT/IB2019/051545, filed Feb. 26, 2019, which claims the benefit of Application No. 62/637,072, filed Mar. 1, 2018, the disclosure of which is incorporated by reference in its/their entirety herein.

BACKGROUND

Formaldehyde is a known carcinogen and allergen. For this reason, the Occupational Safety and Health Administration (OSHA) in the United States has set workplace exposure limits of 0.75 part per million (ppm) of formaldehyde vapor for eight hour exposure and 2 ppm of formaldehyde vapor for 15 minute exposure. The World Health Organization (WHO) recommends maintaining the amount of formaldehyde in air below 0.08 ppm (30-minute average concentration) to prevent significant sensory irritation in the general population.

Despite its toxicity, formaldehyde is a high volume industrial compound. It is used, for example, to prepare polymeric materials that find widespread use in various building materials including foam insulation, particle board, carpet, paint, and varnish. Out-gassing of residual formaldehyde from these building materials makes formaldehyde one of the most prevalent indoor air pollutants. Formaldehyde is also a by-product of the combustion of organic materials. As a result, formaldehyde is a common outdoor pollutant as well, arising from sources such as automobile exhaust, methane combustion, forest fires, and cigarette smoke.

While in North America strict formaldehyde out-gassing limitations are placed on building materials, this is not the case in all parts of the world. In some Asian countries, for example, few restrictions are placed on building materials. Combined with an increased use of biofuels to heat homes and to run automobiles, dangerous levels of formaldehyde vapor may occur in both indoor and outdoor air. For this reason, there is an immediate need for solutions to mitigate human exposure to formaldehyde vapor both as an indoor and an outdoor air pollutant.

People may spend more than 80% of their time indoors, where indoor air pollutants may cause various health problems, including "building related illness" (BRI) and "sick building syndrome" (SBS). It is therefore desirable to reduce the amount of pollutants in indoor air, including the amount of formaldehyde. Materials and methods for capturing aldehydes are needed.

SUMMARY

A sorbent suitable for sorbing aldehydes is provided. The sorbent includes acidified zeolite impregnated with a urea-based compound, the acidified zeolite having a pore opening of 5 Å or greater and a ratio of silicate to aluminate of at least 1.1:1. The acidified zeolite may have a faujasite-type structure. The urea-based compound may be a linear or cyclic urea compound.

The sorbent may be prepared by impregnating acidified zeolite with a solution of a urea-based compound, where the acidified zeolite includes proton counterions and has a pore opening of 5 Å or greater and a molar ratio of silicate to aluminate of at least 1.1:1.

The sorbent may be supported on a filter support to provide an air filter.

An air filter including a filter support and a sorbent suitable for sorbing aldehydes is provided. The sorbent includes acidified zeolite impregnated with a urea-based compound, the acidified zeolite having a pore opening of 5 Å or greater and a ratio of silicate to aluminate of at least 1.1:1. The air filter may include at least 100 grams of the sorbent per meter squared of filter support ($g/m^2$).

A method of sorbing an aldehyde on a sorbent including acidified zeolite impregnated with a urea-based compound is provided. The method includes contacting the aldehyde with the sorbent, the aldehyde being of Formula (I): R—(CO)—H, where R is hydrogen, alkyl, vinyl, or aryl and wherein the molecular weight of the aldehyde of Formula (I) is no greater than 200 grams/mole.

The term "air filter" is used here to describe any apparatus or device in which a sorbent, supported by a filter support, may be exposed to air, e.g., a stream of moving air, so that gaseous and/or particulate substances can be removed from the air. The term "filter support" denotes any structure that can retain sorbent particles and expose them to air, e.g., a stream of moving air, but that does not itself necessarily perform any filtration. The term "filter media" denotes a filter support that is itself capable of capturing particulate substances from air.

The term "pore opening" is used to describe the size of the opening into the pore, which is the diameter of the largest sphere that can diffuse into the pore.

The term "acidified" as used here in conjunction with a sorbent material (e.g., zeolite) means that the material exhibits an acid functionality that may have been brought on by cation exchange and the material has protons within its crystalline lattice. Acidified zeolite, therefore, refers to zeolite with an acid functionality.

The term "sorbing" and similar words such as "sorb", "sorbed", and "sorption" refer to the addition of a first substance (e.g., a gas such as an aldehyde) to a second substance (e.g., a sorbent) by adsorbing, absorbing, or both. Likewise, the term "sorbent" refers to a substance that sorbs a first substance by adsorbing, absorbing, or both.

The term "surface area" refers to the total area of a surface of a material including the internal surfaces of accessible pores. The surface area is typically calculated from adsorption isotherms obtained by measuring the amount of an inert gas (a gas non-reactive with the material being measured), such as nitrogen or argon, that adsorbs on the surface of a material under cryogenic conditions (i.e., 77 K) over a range of relative pressures. The term "BET specific surface area" is the surface area per gram of a material that is typically calculated from adsorption isotherm data of the inert gas over a relative pressure range of 0.05 to 0.3 using the BET method (Brunauer-Emmett-Teller Method).

The term "alkyl" refers to a monovalent group that is a radical of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 30 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. Examples of "alkyl" groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "aryl" refers to a monovalent group that is aromatic and, optionally, carbocyclic. The aryl has at least one aromatic ring. Any additional rings can be unsaturated, partially saturated, saturated, or aromatic. Optionally, the aromatic ring can have one or more additional carbocyclic rings that are fused to the aromatic ring. Unless otherwise indicated, the aryl groups typically contain from 6 to 30 carbon atoms. In some embodiments, the aryl groups contain 6 to 20, 6 to 18, 6 to 16, 6 to 12, or 6 to 10 carbon atoms. Examples of an aryl group include phenyl, naphthyl, biphenyl, phenanthryl, and anthracyl.

The term "acyl" refers to a group derived by removing one or more hydroxyl groups from a carboxylic acid. An acyl group includes an alkyl group and an oxygen atom double bonded to a carbon atom. Examples of an acyl group include methanoyl, ethanoyl, benzoyl, etc.

The term "vinyl" is also known as ethenyl and refers to the functional group with the formula —CH=CH$_2$.

The term "strong acid" is used to refer to acids that completely ionize (i.e., dissociate) in a solution. Examples of strong acids are hydrochloric acid, phosphoric acid, nitric acid, and sulfuric acid.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

In this disclosure, terms such as "a," "an," and "the" are not intended to refer to only a singular entity but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 20° C. to 30° C., or 20° C. to 25° C., or 22° C. to 25° C.

The term "in the range" or "within a range" (and similar statements) includes the endpoints of the stated range.

The term "substantially free" as used here means that the material or composition does not include the component in question in a quantity that interferes with or contributes to the activity or action of the material or composition. For example, the material or composition may contain the component in question at an amount of 1% or less, 0.5% or less, 0.1% or less, or 0.01% or less. The component in question may be present at an amount that would be considered an impurity.

Groupings of alternative elements or embodiments disclosed here are not to be construed as limitations. Each group member may be referred to and claimed individually or in any combination with other members of the group or other elements found therein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

The words "preferred" and "preferably" refer to embodiments of the disclosure that may afford certain benefits, under certain circumstances. However, other claims may also be preferred, under the same or other circumstances. Furthermore, the recitation of one or more preferred claims does not imply that other claims are not useful and is not intended to exclude other claims from the scope of the disclosure.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired.

DETAILED DESCRIPTION

The present disclosure relates to sorbents useful for capturing aldehydes from air. In particular, the present disclosure relates to acidified zeolite-based sorbents that are impregnated with a urea-compound. The present disclosure further relates to air filters that include sorbents useful for capturing aldehydes from air.

Available technologies for removing formaldehyde from indoor air environments include adsorption filtration, ultraviolet photocatalytic oxidation, ozonation, and ionization/plasma. Some technologies, however, pose potential problems due to possible production of harmful intermediates and secondary products, and therefore adsorption filtration is a preferred technology for removing formaldehyde from air. In adsorption filtration, airborne chemicals are removed from the air by physical and/or chemical adsorption (retention) on a solid sorbent.

Formaldehyde is a gas at room temperature, and its high volatility makes it extremely difficult to capture by physisorption alone. Because formaldehyde is reactive, however, it can be more readily captured through chemisorption. With chemisorption, the formaldehyde vapors are captured by chemically reacting with the sorbent itself or with chemicals impregnated in the sorbent.

Some sorbent materials that have been used for capturing formaldehyde are based on an activated carbon scaffold. Activated carbon itself, however, has negligible formaldehyde capacity. Further, the scaffold of activated carbon is relatively inactive, which makes it difficult to incorporate reactive groups into the activated carbon scaffold at a sufficient density. Reactive chemistries (most commonly amines) are, therefore, incorporated by impregnation into activated carbon to make sorbents for formaldehyde. Common impregnation chemistries used with activated carbon include the sodium salt of sulfamic acid, Tris (i.e., tris (hydroxymethyl)-aminomethane), potassium iodide, and some urea-based compounds (e.g., ethylene urea) co-impregnated with phosphoric acid. Various other metal salts have been used as well.

Urea-based compounds and acids (e.g., phosphoric acid) together are effective for capturing formaldehyde. The use of urea-based impregnates has several advantages. First, urea-based compounds contain more than one active site in the molecule to react with formaldehyde. Thus, multiple formaldehyde molecules can be captured by a single urea-based molecule. In the case of ethylene urea, both urea nitrogens can react with formaldehyde such that two formaldehyde molecules are captured for every ethylene urea molecule. Therefore, sorbents impregnated with urea-based compounds can show marked improvements in capacities for formaldehyde over other impregnate chemistries. Second, urea-based compounds have very low volatility, making them suitable for use as impregnates because they do not volatilize over time and leach out of the sorbent material. Furthermore, their high solubility in water and ethanol make them very easy to impregnate in high concentrations.

While urea-based impregnates have several advantages, the currently known sorbents experience multiple challenges. For example, the nucleophilicity of the nitrogens in urea is low, rendering the urea-based compound not very reactive to formaldehyde by itself. To overcome this lack of reactivity, urea-based impregnates have been co-impregnated with a strong acid, typically a mineral acid such as phosphoric acid (see, e.g., activated-carbon based sorbents discussed above). Also, impregnation in general tends to slow down the kinetics of capture of a sorbent. Although the capacity of the sorbent to capture formaldehyde is greater when the amount of active formaldehyde-capturing compound impregnated into the pores of the sorbent is greater, over-impregnation can substantially fill the pores of the sorbent and ultimately result in such a dramatic decrease in the porosity of the sorbent that access to the impregnation chemistries is cut off and the capacity of the sorbent greatly decreases. The inclusion of the strong acid together with a urea-based compound occupies space within the pores of the sorbent, thus reducing the capacity of the pores.

The present disclosure provides a sorbent that balances the amount of active aldehyde-capturing compound while not over-impregnating the sorbent. In particular, the present disclosure provides for a way to reduce the number of impregnates while maintaining or increasing the capacity of the sorbent.

The sorbents of the present disclosure include zeolite with an acidic functionality as part of the scaffold of the sorbent, impregnated with one or more urea-based compounds. The zeolite is acidified and has protons as the charge-balancing cation of the framework.

Zeolites are a group of minerals that include hydrated aluminosilicates of sodium, potassium, magnesium, and barium. While some zeolites can be found in nature, many commercially available zeolites are synthetically manufactured.

Zeolites are unique in that their regular crystalline structure results in the zeolite having significant microporosity formed by interconnected voids. Most zeolites have inner voids with pore openings ranging from 3-15 Å (Angstrom). The pore opening of the zeolite is defined as the size of the opening into the pore (the size of the largest sphere that could diffuse into the pore) and may be determined by the size of the molecular ring forming the opening of the pore. For example, a zeolite with a 12-membered ring pore opening has a pore opening of 7.4 Å. The size of the inner cavity of the pore may be larger than the pore size. Pore opening may be measured using any conventional technique, such as X-ray diffraction ("XRD").

Commercially available synthetic zeolites are typically divided into various types based on their structures. Examples of zeolite types include A, X ("X zeolites"), Y ("Y zeolites"), P, and NaPl. Zeolites are also available with varying pore sizes, specific surface areas, and ratios of silicate/aluminate. The ratio of silicate to aluminate in the framework of the zeolite plays a significant role in determining the electric charge and thus the hydrophilicity of the zeolite. The greater the amount of aluminate in the framework, the greater the number of charged sites, resulting in the framework having increased hydrophilicity. The charges are typically balanced by cations such as sodium ($Na^+$), potassium ($K^+$), calcium ($Ca^{2+}$), or magnesium ($Mg^{2+}$).

According to an embodiment, the sorbent includes acidified zeolite. The zeolite may be acidified using any suitable method. In one embodiment, the zeolite is acidified by subjecting the zeolite to ammonium to effect an ion exchange reaction such that the cations (e.g., sodium ions) in the zeolite are exchanged with ammonium cations. By calcining the ammonium cation form of the zeolite, ammonia is released leaving behind a proton. The acidified zeolite thus includes protons within its crystalline lattice and exhibits an acid functionality. In some embodiments, the sorbent is free of or substantially free of other acids (i.e., acids other than acidified zeolite). Further according to an embodiment, the acidified zeolite is impregnated with one or more urea-based compounds. The urea-based compound may include a cyclic urea.

In conventional impregnated sorbents (e.g., impregnated activated carbon) the urea-based compound is typically accompanied by a strong acid, such as phosphoric acid, to provide a catalyst for the reaction between the urea-based compound and formaldehyde. The acid takes up space within the pores of the sorbent, however, leaving less room for the urea-based compound and formaldehyde. One possible benefit achieved by using acidified zeolite impregnated with a urea-based compound is that there is no need to separately include an acid with the impregnate. Further, strong acids are known to damage the crystalline structure of zeolites and are thus not preferred for impregnation of zeolites.

According to an embodiment, the sorbent includes acidified zeolite impregnated with a urea-based compound. The acidified zeolite may have a pore opening of 5 Ångstrom ("Å") or greater and a molar ratio of silicate to aluminate of at least 1.1:1. The pore opening of the acidified zeolite may be at least 7 Å. The pore opening of the acidified zeolite may be up to 14 Å. In one exemplary embodiment, the pore opening of the acidified zeolite is 7.4 Å.

The acidified zeolite may have a faujasite-type structure. Faujasites occur naturally but may also be synthesized industrially from alumina and silica. Faujasite has a crystal structure formed of sodalite cages connected by hexagonal prisms and includes a pore that is formed by a 12-membered ring. Synthetic faujasite zeolites can be divided into X-type and Y-type zeolites. In one embodiment, the acidified zeolite is an X-type zeolite (e.g., prepared from zeolite 13X). For example, acidified zeolite may be produced by subjecting the zeolite to ammonium to effect an ion exchange reaction, and then calcining the ammonium ions. After calcining, the acidified zeolite includes protons as a counterion within the crystalline lattice of the zeolite. The acidified zeolite may be free of or substantially free of ammonium ions.

The ratio of silicate to aluminate in the zeolite may be selected to provide a suitable level of hydrophilicity. The molar ratio of silicate to aluminate in the zeolite may be at least 1.1:1 (at least 1.1 parts silicate for every 1 part of aluminate), at least 1.15:1, at least 1.2:1, at least 1.5:1, at least 2:1, or at least 5:1. The molar ratio of silicate to aluminate in the zeolite may be up to 130:1 (up to 130 parts silicate for every 1 part of aluminate), up to 100:1, up to 80:1, up to 75:1, up to 70:1, or up to 50:1. For example, the molar ratio of silicate to aluminate in the zeolite may range from 1.1:1 to 130:1, from 1.15:1 to 100:1, or from 1.2:1 to 80:1.

The urea-based compound may be a compound derived from urea by substituting an alkyl or acyl group for at least one hydrogen atom of the urea and may have either a linear structure or a cyclic structure. A linear urea has a urea-linkage which does not form a cyclic structure that would include that urea moiety as part of the cyclic structure. Examples of linear urea compounds include methylurea, ethylurea, dimethylurea, diethylurea, acetylurea, acetylmethylurea, phenylurea and diphenylurea. The urea-based compound impregnated into the acidified zeolite may be a cyclic urea. Examples of suitable cyclic ureas include ethyleneurea (i.e., 2-imidazolidone), hydantoin, allantoin, alloxanic acid, oxazolylurea (i.e., parabanic acid), 5,5-dimethylhydantoin, urazole, malonylurea (i.e., barbituric acid), mesoxalylurea (i.e., alloxan), hydroxymalonylurea (i.e., dialuric acid), uramil (i.e., aminobarbituric acid), dilituric acid (i.e., nitrobarbituric acid), violuric acid (i.e., isonitrosobarbituric acid), pseudouric acid (i.e., ureidobarbituric acid), uracil (i.e., 2,4-dihydroxypyrimidine), thymine (i.e., 5-methyluracil), isocyanuric acid, uric acid (i.e., 2,6,8-trihydroxypurine), alloxanthine, and combinations thereof. In one embodiment the urea-based compound includes or is ethyleneurea.

The sorbent may include any suitable amount of the urea-based compound impregnated into the acidified zeolite. For example, the sorbent may include at least 1%, at least 2%, at least 3%, at least 5%, at least 8%, at least 10%, or at least 12% of the urea-based compound by weight of the sorbent. The sorbent may include up to 80%, up to 60%, up to 50%, up to 40%, up to 30%, or up to 20% of the urea-based compound by weight of the sorbent. For example, the sorbent may include from 1% to 60%, from 2% to 50%, or from 3% to 40% of the urea-based compound by weight of the sorbent. In some embodiments, the sorbent includes at least 0.2 millimole (mmol) of the urea-based compound per gram (g) of zeolite, or at least 0.3 mmol/g, at least 0.4 mmol/g, at least 0.5 mmol/g, at least 0.7 mmol/g, at least 1.0 mmol/g, at least 1.5 mmol/g, or at least 2.0 mmol/g. The sorbent may include up to 6 mmol of the urea-based compound per gram of zeolite, or up to 5.5 mmol/g, up to 5 mmol/g, up to 4 mmol/g, up to 3.5 mmol/g, up to 3 mmol/g, or up to 2.5 mmol/g.

The sorbent may be prepared by acidifying zeolite to produce acidified zeolite with a proton counterion and impregnating the acidified zeolite with a solution of the urea-based compound.

The sorbent may be used in an air filter to provide the air filter with a capacity for removing compounds such as aldehydes (e.g., formaldehyde) from air. In at least some embodiments, the sorbent has an aldehyde capacity of at least 0.25 millimole (mmol) of aldehyde per gram (g) of sorbent, at least 0.5 mmol/g, at least 0.6 mmol/g, at least 0.75 mmol/g, or at least 1 mmol/g. There is no desired upper limit for the aldehyde capacity of the sorbent. In practice, capacities of up to 12 mmol/g are possible.

In some embodiments, the sorbent has a formaldehyde capacity of at least 0.25 millimole (mmol) of formaldehyde per gram (g) of sorbent, at least 0.5 mmol/g, at least 0.6 mmol/g, at least 0.75 mmol/g, or at least 1 mmol/g. There is no desired upper limit for the formaldehyde capacity of the sorbent. In practice, capacities of up to 12 mmol/g are possible.

Figure 1:
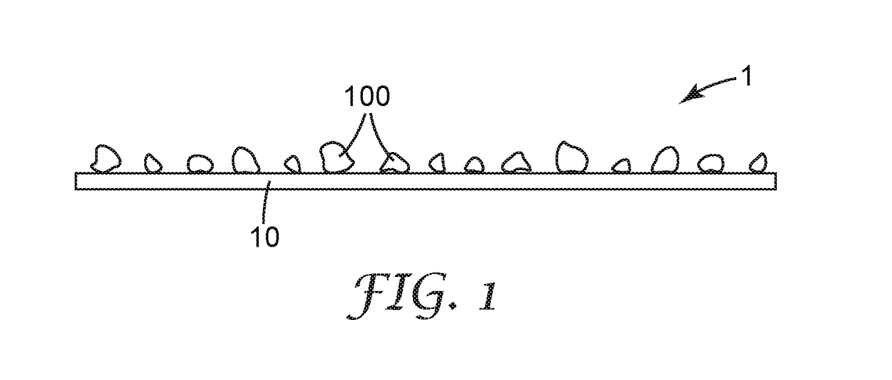
FIG. 1 is a schematic view of a portion of an air filter with a filter support and sorbent particles dispersed therein according to an embodiment.

FIG. 1 shows an exemplary air filter 1 that includes at least one filter support 10, according to an embodiment. A filter support 10 can be any structure that supports sorbent particles 100 in such a manner that exposes them to air, while retaining the sorbent particles so that, if the air is moving, the sorbent particles are not dislodged by the moving air. For example, the filter support 10 may include an adhesive to adhere the sorbent particles 100 to the filter support 10. If the air is moving, it may encounter individual sorbent particles or a collection of sorbent particles while in laminar flow or while in turbulent flow, or the air may transition between flow regimes. In some embodiments, the filter support 10 may take the form of a substrate on which sorbent particles 100 are provided (e.g., are attached to a major surface thereof) and across which a moving stream of air may traverse. In some embodiments the filter support 10 may retain sorbent particles 100 by way of the sorbent particles being attached (e.g., adhesively bonded) to the filter support 10.

Figure 2:
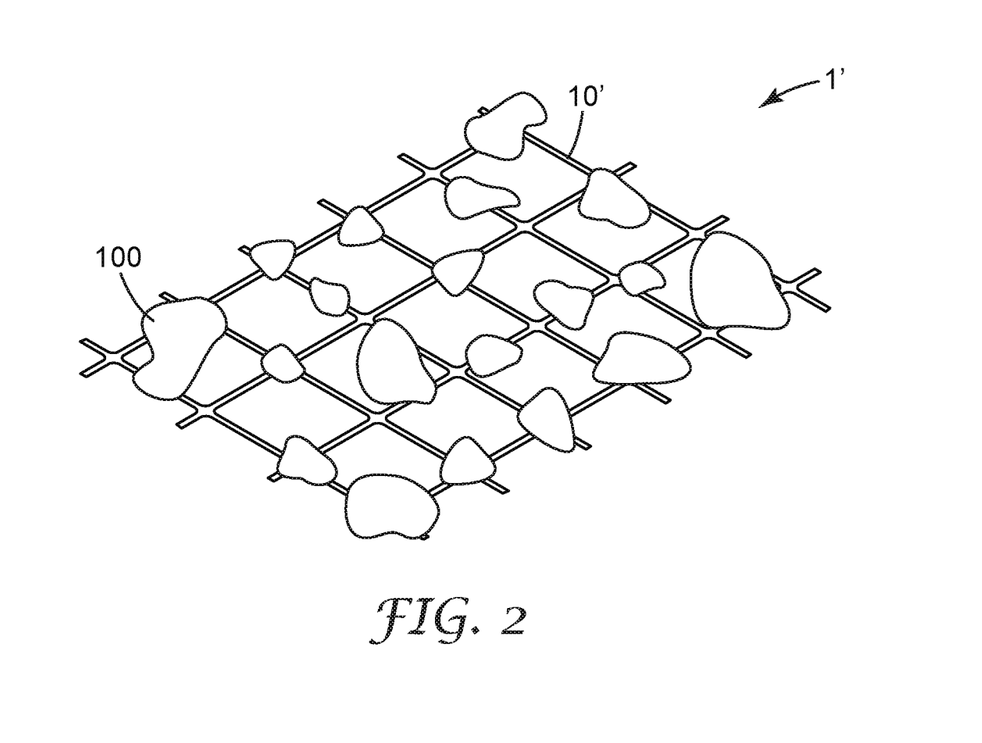
FIG. 2 is a schematic view of a portion of another exemplary air filter according to an embodiment.

In an alternative embodiment of an air filter 1', a filter support 10' may retain sorbent particles 100 by mechanically retaining the sorbent particles within the filter support 10', as schematically shown in FIG. 2. In the embodiment shown, the sorbent particles 100 may not necessarily be attached to the filter support 10', but the filter support 10' can physically block the sorbent particles from being dislodged and removed from the filter support 10'. In some embodiments, a combination of mechanical retention and attachment (e.g., bonding) of sorbent particles to the filter support 10' may be employed.

In some embodiments, the air filter 1, 1' includes a filter support 10, 10' and sorbent particles 100. In some embodiments, the air filter 1 also includes other layers as desired for any purpose, and/or may additionally include any other ancillary components, such as a frame, one or more reinforcing or stabilizing members, one or more housing pieces, etc.

As noted with reference to FIG. 1, in some embodiments the filter support may take the form of a substrate (which substrate may be air impermeable or air permeable) with sorbent particles 100 disposed, e.g., adhered, on a major surface of the substrate. Air filters of this type may include, for example, a planar or pleated substrate bearing sorbent particles attached to a major surface thereof; a hollow tube with sorbent particles attached to an interior surface thereof, or an array of flow-through channels provided by stacked or nested microstructured substrates (e.g., of the general type described in U.S. Pat. No. 7,955,570 to Insley) with sorbent particles attached to interior surfaces of the flow-through channels; and the like. In some embodiments sorbent particles 100 may be provided at least substantially as a monolayer on a surface of the substrate (e.g. as shown in FIG. 1), except for such occasional stacking as may occur statistically in any industrial-scale deposition process. In other embodiments, the sorbent particles may be present in multiple layers, where at least some of the layers may be adhesively bonded onto a surface of the substrate or an underlying layer.

Any suitable filter support may be used, such as a woven or non-woven substrate. The woven or non-woven substrate may be made of any suitable material, such as wool, steel wool, silk, glass fibers, cellulosic fibers (e.g., crepe paper, Kraft paper, cotton, linen, viscose, or rayon), synthetic fibers (e.g., nylon, rayon, polyester, polyethylene, polypropylene, polyvinyl alcohol, acrylic, acetate, polyamide, or carbon fiber), and combinations thereof. Suitable filter supports are capable of supporting the sorbent on or in the substrate, and allow for gases (e.g., air) to come into contact with the sorbent.

One possible benefit from using the sorbent of the present disclosure on an air filter is that the sorbent is white or light in color. Therefore, when used on a white or light-colored filter support, the sorbent does not visually stand out as opposed to, for example, activated carbon, which can be seen as black dust or particles against a white or light-colored filter support and can make even a new filter appear dirty or used.

The air filter may optionally include filter media and/or other additives or sorbent materials (in addition to acidified impregnated zeolite sorbents), such as activated alumina, silica gel, zeolite, kaolin, adsorbent clay, activated bauxite, activated carbon, and combinations thereof.

In some embodiments, the air filter includes a filter support and the sorbent of acidified zeolite impregnated with one or more urea-based compounds. The acidified zeolite may have a pore opening of 5 Å or greater and a molar ratio of silicate to aluminate of at least 1.1:1. In some embodiments, the pore openings are 7 Å or greater, 8 Å or greater, 9 Å or greater, 10 Å or greater, or 12 Å or greater. The pore openings may be 14 Å or smaller, 13 Å or smaller, 12 Å or smaller, or 10 Å or smaller. For example, the pore openings may range from 5 Å to 14 Å or from 7 Å to 14 Å. The molar ratio of silicate to aluminate in the zeolite may be at least 1.1:1 (at least 1.1 parts silicate for every 1 part of aluminate), at least 1.15:1, at least 1.2:1, at least 1.5:1, at least 2:1, or at least 5:1. The molar ratio of silicate to aluminate in the zeolite may be up to 130:1 (up to 130 parts silicate for every 1 part of aluminate), up to 100:1, up to 80:1, up to 75:1, up to 70:1, or up to 50:1. For example, the molar ratio of silicate to aluminate in the acidified zeolite may be from 1.1:1 to 130:1, from 1.15:1 to 100:1, or from 1.2:1 to 80:1. The air filter may include an acidified zeolite that has a faujasite-type structure. One example of faujasite-type zeolites is an X-type zeolite.

The urea-based compound used to impregnate the acidified zeolite of the air filter may be a cyclic urea or a linear urea as discussed above with regard to the impregnated and acidified zeolite.

The air filter may include any suitable amount of the sorbent (acidified zeolite impregnated with a urea-based compound). In some embodiments, where the air filter includes a planar or pleated filter support with sorbent, the air filter includes at least 100 grams of the sorbent per square meter of filter support ($g/m^2$), at least 150 $g/m^2$, or at least 250 $g/m^2$ of the sorbent. The air filter may include up to 1000 $g/m^2$, up to 750 $g/m^2$, or up to 500 $g/m^2$ of the sorbent.

The air filter including the sorbent has a high efficiency for removing aldehydes, such as formaldehyde, from air. Preferably the aldehyde-removing efficiency of the air filter is comparable or better than conventional air filters, such as those including impregnated activated carbon. In some embodiments, the air filter has an improved initial efficiency. The initial efficiency may be measured as the proportion of aldehyde removed from air during the first 5 minutes of filtration at a concentration of 10 ppm aldehyde and 50% relative humidity (for further details see Filter Efficiency and Capacity Test in the Examples). According to some embodiments, the air filter has an initial efficiency of 50% or greater, 60% or greater, 70% or greater, or 75% or greater for removing aldehyde from air. According to certain embodiments, the air filter has an initial efficiency of 50% or greater, 60% or greater, 70% or greater, or 75% or greater for removing formaldehyde from air.

The present disclosure also relates to methods of making the sorbent and to methods of applying the sorbent onto an air filter to prepare an air filter with sorbent capable of sorbing an aldehyde.

According to an embodiment, the method includes impregnating acidified zeolite with a solution of a urea-based compound, where the acidified zeolite has a pore opening of 5 Å or greater and a molar ratio of silicate to aluminate of at least 1.1:1.

Prior to impregnating, the method may include acidifying the zeolite to produce acidified zeolite with a proton counterion. The zeolite may have a faujasite-type structure. For example, the zeolite may be an X-type zeolite, such as zeolite 13X. In one embodiment, the zeolite is acidified by subjecting the zeolite to ammonium cations to effect an ion exchange reaction, and then calcining the ammonium cations. After calcining, the acidified zeolite includes protons as a counterion within the crystalline lattice of the zeolite. The acidified zeolite is free of or substantially free of ammonium ions.

The acidified zeolite is impregnated by subjecting the acidified zeolite to a urea-based compound. This may be done, for example, by immersing or mixing the acidified zeolite with a solution of the urea-based compound. The solution may include at least 5%, at least 7%, at least 8%, at least 9%, at least 10%, at least 12%, at least 15%, or at least 18% of urea-based compound by weight of the solution. The solution may include 40% or less, 35% or less, 30% or less, or 25% or less of urea-based compound by weight of the solution. For example, the solution may include from 5% to 40%, from 7% to 35%, or from 9% to 30% of urea-based compound by weight of the solution. The solution may include any suitable solvent. Suitable solvents can be removed from the impregnated acidified zeolite by drying. Examples of suitable solvents include aqueous solvents, alcohols, and mixtures of solvents. The impregnated zeolite may be removed (e.g., separated) from the mixture and dried to remove the solvent.

When the acidified zeolite is subjected to the urea-based compound, at least some of the urea-based compound may enter the cavities or pores in the crystalline structure of the zeolite. Some urea-based compound will also remain on other surfaces (e.g., outside surfaces as opposed to inside pores) of the acidified zeolite. When the sorbent is exposed to an aldehyde (e.g., formaldehyde), the urea-based compound reacts and binds the aldehyde, with the proton counterion of the acidified zeolite acting as a catalyst.

The silicate to aluminate ratio and the pore opening of the zeolite, and the type and amount of urea-based compound may be selected to affect the sorption kinetics and capacity of the resulting sorbent. For example, having a lower silicate to aluminate ratio causes the zeolite to be more hydrophilic, to have more charged sites, and thus result in more acidic sites upon acidification. On the other hand, if the ratio of silicate to aluminate is too low, the zeolite may be so hydrophilic that the uptake of water interferes with the reaction between the urea-based compound, aldehyde, and acid. The pore opening of the zeolite should be large enough to accommodate the urea-based compound and the aldehyde. For example, the pore opening of the acidified zeolite may be in the range of 5 Å to 14 Å. In some embodiments, the pore openings are 7 Å or greater, 8 Å or greater, 9 Å or greater, 10 Å or greater, or 12 Å or greater. The pore opening may be 14 Å or smaller, 13 Å or smaller, 12 Å or smaller, or 10 Å or smaller. In one exemplary embodiment, the pore opening of the acidified zeolite is 7.4 Å.

The urea-based compound used in the method to impregnate the acidified zeolite may be a linear urea or a cyclic urea, as discussed above.

The urea-based compound may be selected so that the compound has more than one active site capable of reacting with the aldehyde. For example, in ethylene urea, both urea nitrogens can react with the aldehyde so that two aldehyde molecules per one molecule of ethylene urea can be captured. Further, due to their very low volatility, urea-based compounds do not significantly volatilize and leach out of the sorbent over time. Their high solubility in aqueous solvents (e.g., water and mixtures of water and another solvent, such as ethanol) makes urea-based compounds easy to impregnate at high concentrations.

The amount of urea-based compound impacts the capacity and kinetics of the sorbent. More urea-based compound translates to more capacity to bind aldehydes. However, too much urea-based compound could fill and essentially block the pores of the zeolite, slowing down the kinetics of aldehyde capture. In some cases, a tradeoff may be seen between the kinetics of capture and overall capacity, where the kinetics of capture may be higher when slightly less of the urea-based compound is used, and overall capacity may be higher when slightly more of the urea-based compound is used. The amount of urea-based compound can, therefore, be optimized based on the desired capacity and kinetics of the sorbent. In some embodiments, the sorbent includes at least 0.2 millimole (mmol) of the urea-based compound per gram (g) of zeolite, or at least 0.3 mmol/g, at least 0.4 mmol/g, at least 0.5 mmol/g, at least 0.7 mmol/g, at least 1.0 mmol/g, at least 1.5 mmol/g, or at least 2.0 mmol/g. The sorbent may include up to 6 mmol of the urea-based compound per gram of zeolite, or up to 5.5 mmol/g, up to 5 mmol/g, up to 4 mmol/g, up to 3.5 mmol/g, up to 3 mmol/g, or up to 2.5 mmol/g.

A method for making an air filter including the sorbent may include impregnating acidified zeolite with a solution of a urea-based compound to produce the sorbent, and supporting the impregnated acidified zeolite (e.g., the sorbent) on a filter support. The method may also include an acidification step to acidify the zeolite as discussed above, and/or a drying step (e.g., by removing the solvent or allowing the solvent to evaporate) after impregnation of the acidified zeolite. An adhesive may optionally be added to the filter support to adhere (e.g., to adhesively bond) the sorbent particles to the filter support. This may be done, for example, by coating an adhesive or an adhesive precursor onto the filter support, optionally converting the adhesive precursor to an adhesive, and depositing sorbent particles. In some embodiments sorbent particles may be applied on the filter support in a monolayer. In other embodiments, the sorbent particles may be applied at least in part in multiple layers (made, e.g., by adhesively bonding a first layer of sorbent particles onto the filter support, applying additional adhesive onto the first layer, and depositing more sorbent particles, etc.). Examples of suitable adhesives include pressure-sensitive adhesives, hot-melt adhesives, epoxy adhesives, and the like. Commercially available examples of suitable adhesives include products available under the trade designation ACRONAL from BASF Corp. (Charlotte, N.C.); products available under the trade designations SUPER 77 MULTI-PURPOSE SPRAY ADHESIVE and HI STRENGTH 90 SPRAY ADHESIVE from 3M Company (St. Paul, Minn.); a product available under the trade designation DEVCON 5 MINUTE EPDXY from ITW (Danvers, Mass.); and products available under the trade designation GORILLA GLUE from Gorilla Glue, Inc. (Cincinnati, Ohio).

The sorbent may be applied to the filter support in any suitable manner. For example, the sorbent may be applied as a powder by blowing or sprinkling, or as a liquid dispersion by spraying, immersion, etc. The filter support may include an adhesive to adhere sorbent particles to the substrate.

Any suitable amount of the sorbent (acidified zeolite impregnated with a urea-based compound) may be added to the filter. In some embodiments, the air filter includes at least 100 grams of the sorbent per square meter of filter support ($g/m^2$), at least 150 $g/m^2$, or at least 250 $g/m^2$ of the sorbent. The air filter may include up to 1000 $g/m^2$, up to 750 $g/m^2$, or up to 500 $g/m^2$ of sorbent.

The present disclosure also relates to methods of using the air filter including the sorbent, and to methods of capturing an aldehyde on the sorbent.

The air filter may be used in any suitable manner for removing aldehydes from air. For example, the air filter including a filter support and a sorbent may be positioned so that the sorbent is exposed to the air. Air movement to the sorbent and/or across or through the filter may be passive or active (e.g., assisted by a pump or fan).

According to an embodiment, an aldehyde represented by Formula (I) is sorbed on the sorbent:

R—(CO)—H     Formula (I), where R is hydrogen, alkyl, vinyl, or aryl, and where the molecular weight of the aldehyde of Formula (I) is no greater than 200 grams/mole. In one embodiment the aldehyde is formaldehyde.

The air filter may have an initial efficiency that is measured during the first 5 minutes of exposure to the sorbent at a concentration of 10 ppm aldehyde and 50% relative humidity. The initial efficiency may be measured during the first 5 minutes of exposure to the sorbent at a concentration of 10 ppm formaldehyde and 50% relative humidity. The initial efficiency will depend on the type of filter, such as a planar or pleated filter, and may be 30% or greater, 35% or greater, 40% or greater, 50% or greater, or 60% or greater.

The sorbent may have the capacity to sorb at least 0.25 millimoles (mmol) of aldehyde per gram (g) of sorbent, of at least 0.5 mmol/g, at least 0.75 mmol/g, or at least 1 mmol/g. The sorbent may have the capacity to sorb up to 12 mmol/g, up to 10 mmol/g, or up to 8 mmol/g of aldehyde.

The used air filter includes a composition with the sorbent and an aldehyde sorbed on the sorbent, the aldehyde being of Formula (I):

R—(CO)—H     Formula (I), where R is hydrogen, alkyl, vinyl, or aryl, and where the molecular weight of the aldehyde of Formula (I) is no greater than 200 grams/mole. In one embodiment the aldehyde is formaldehyde.

EXEMPLARY EMBODIMENTS

Embodiment 1 is a sorbent comprising acidified zeolite impregnated with a urea-based compound, the acidified zeolite having a pore opening of 5 Å or greater and a molar ratio of silicate to aluminate of at least 1.1:1.

Embodiment 2 is the sorbent of embodiment 1, wherein the acidified zeolite has a pore opening of 7 Å or greater.

Embodiment 3 is the sorbent of embodiment 1 or 2, wherein the acidified zeolite has a pore opening of up to 14 Å.

Embodiment 4 is the sorbent of any one of the above embodiments, wherein the molar ratio of silicate to aluminate is at least 1.1:1, at least 1.15:1, at least 1.2:1, at least 1.5:1, at least 2:1, or at least 5:1.

Embodiment 5 is the sorbent of any one of the above embodiments, wherein the molar ratio of silicate to aluminate is up to 130:1, up to 100:1, up to 80:1, up to 75:1, up to 70:1, or up to 50:1.

Embodiment 6 is the sorbent of any one of the above embodiments, wherein the acidified zeolite has a faujasite-type structure.

Embodiment 7 is the sorbent of any one of the above embodiments, wherein the acidified zeolite is an X-type zeolite.

Embodiment 8 is the sorbent of any one of the above embodiments, wherein the urea-based compound comprises a cyclic urea selected from ethyleneurea (i.e., 2-imidazolidone), hydantoin, allantoin, alloxanic acid, oxazolylurea (i.e., parabanic acid), 5,5-dimethylhydantoin, urazole, malonylurea (i.e., barbituric acid), mesoxalylurea (i.e., alloxan), hydroxymalonylurea (i.e., dialuric acid), uramil (i.e., aminobarbituric acid), dilituric acid (i.e., nitrobarbituric acid), violuric acid (i.e., isonitrosobarbituric acid), pseudouric acid (i.e., ureidobarbituric acid), uracil (i.e., 2,4-dihydroxypyrimidine), thymine (i.e., 5-methyluracil), isocyanuric acid, uric acid (i.e., 2,6,8-trihydroxypurine), alloxanthine, and combinations thereof.

Embodiment 9 is the sorbent of any one of the above embodiments, wherein the urea-based compound is ethyleneurea.

Embodiment 10 is the sorbent of any one of the above embodiments, wherein the sorbent comprises at least 1%, at least 2%, at least 3%, at least 5%, at least 8%, at least 10%, or at least 12% of the urea-based compound by weight of the sorbent.

Embodiment 11 is the sorbent of any one of the above embodiments, wherein the sorbent comprises up to 80%, up to 60%, up to 50%, up to 40%, up to 30%, or up to 20% of the urea-based compound by weight of the sorbent.

Embodiment 12 is the sorbent of any one of the above embodiments, wherein the sorbent is prepared by acidifying zeolite to produce acidified zeolite with a proton counterion and impregnating the acidified zeolite with a solution of the urea-based compound.

Embodiment 13 is the sorbent of embodiment 12, wherein the solution of the urea-based compound comprises at least 5%, at least 7%, at least 9%, at least 10%, or at least 15% of the urea-based compound by weight of the solution.

Embodiment 14 is the sorbent of embodiment 12 or 13, wherein the solution of the urea-based compound comprises up to 25%, up to 30%, up to 35%, or up to 40% of the urea-based compound by weight of the solution.

Embodiment 15 is the sorbent of any one of the above embodiments, wherein the sorbent has an aldehyde capacity of at least 0.25 mmol/g, at least 0.5 mmol/g, at least 0.6 mmol/g, at least 0.75 mmol/g, or at least 1 mmol/g.

Embodiment 16 is an air filter comprising a filter support and the sorbent of any of the preceding embodiments.

Embodiment 17 is an air filter comprising a filter support; and a sorbent comprising acidified zeolite impregnated with a urea-based compound, the acidified zeolite having a pore opening of 5 Å or greater and a molar ratio of silicate to aluminate of at least 1.1:1.

Embodiment 18 is the air filter of embodiment 17, wherein the acidified zeolite has a pore opening of 7 Å or greater.

Embodiment 19 is the air filter of embodiment 17 or 18, wherein the acidified zeolite has a pore opening of up to 14 Å.

Embodiment 20 is the air filter of any one of embodiments 17-19, wherein the molar ratio of silicate to aluminate is at least 1.1:1, at least 1.15:1, at least 1.2:1, at least 1.5:1, at least 2:1, or at least 5:1.

Embodiment 21 is the air filter of any one of embodiments 17-20, wherein the molar ratio of silicate to aluminate is up to 130:1, up to 100:1, up to 80:1, up to 75:1, up to 70:1, or up to 50:1.

Embodiment 22 is the air filter of any one of embodiments 17-21, wherein the acidified zeolite has a faujasite-type structure.

Embodiment 23 is the air filter of any one of embodiments 17-22, wherein the acidified zeolite is an X-type zeolite.

Embodiment 24 is the air filter of any one of embodiments 17-23, wherein the urea-based compound comprises cyclic urea selected from ethyleneurea (i.e., 2-imidazolidone), hydantoin, allantoin, alloxanic acid, oxazolylurea (i.e., parabanic acid), 5,5-dimethylhydantoin, urazole, malonylurea (i.e., barbituric acid), mesoxalylurea (i.e., alloxan), hydroxymalonylurea (i.e., dialuric acid), uramil (i.e., aminobarbituric acid), dilituric acid (i.e., nitrobarbituric acid), violuric acid (i.e., isonitrosobarbituric acid), pseudouric acid (i.e., ureidobarbituric acid), uracil (i.e., 2,4-dihydroxypyrimidine), thymine (i.e., 5-methyluracil), isocyanuric acid, uric acid (i.e., 2,6,8-trihydroxypurine), alloxanthine, and combinations thereof.

Embodiment 25 is the air filter of any one of embodiments 17-24, wherein the urea-based compound is ethyleneurea.

Embodiment 26 is the air filter of any one of embodiments 17-25, wherein the filter comprises at least 100 g/m², at least 150 g/m², or at least 250 g/m² of the sorbent.

Embodiment 27 is a method for making a sorbent, the method comprising impregnating acidified zeolite with a solution of a urea-based compound, the acidified zeolite comprising proton counterions and having a pore opening of 5 Å or greater and a molar ratio of silicate to aluminate of at least 1.1:1.

Embodiment 28 is the method of embodiment 27, further comprising acidifying zeolite to produce the acidified zeolite with a proton counterion prior to impregnating the acidified zeolite.

Embodiment 29 is the method of any one of embodiments 27-28, wherein the acidified zeolite is produced by subjecting zeolite to ammonium cations to effect an ion exchange reaction and then calcining the ammonium cations.

Embodiment 30 is the method of any one of embodiments 27-29, wherein the solution of the urea-based compound comprises at least 5%, at least 7%, at least 9%, at least 10%, or at least 15% of the urea-based compound by weight of the solution.

Embodiment 31 is the method of any one of embodiments 27-30, wherein the solution of the urea-based compound comprises up to 25%, up to 30%, up to 35%, or up to 40% of the urea-based compound by weight of the solution.

Embodiment 32 is the method of any one of embodiments 27-31, wherein the acidified zeolite has a pore opening of 7 Å or greater.

Embodiment 33 is the method of any one of embodiments 27-32, wherein the acidified zeolite has a pore opening of up to 14 Å.

Embodiment 34 is the method of any one of embodiments 27-33, wherein the molar ratio of silicate to aluminate is at least 1.1:1, at least 1.15:1, at least 1.2:1, at least 1.5:1, at least 2:1, or at least 5:1.

Embodiment 35 is the method of any one of embodiments 27-34, wherein the molar ratio of silicate to aluminate is up to 130:1, up to 100:1, up to 80:1, up to 75:1, up to 70:1, or up to 50:1.

Embodiment 36 is the method of any one of embodiments 27-35, wherein the acidified zeolite has a faujasite-type structure.

Embodiment 37 is the method of any one of embodiments 27-36, wherein the acidified zeolite is an X-type zeolite.

Embodiment 38 is the method of any one of embodiments 27-37, wherein the urea-based compound comprises a cyclic urea selected from ethyleneurea (i.e., 2-imidazolidone), hydantoin, allantoin, alloxanic acid, oxazolylurea (i.e., parabanic acid), 5,5-dimethylhydantoin, urazole, malonylurea (i.e., barbituric acid), mesoxalylurea (i.e., alloxan), hydroxymalonylurea (i.e., dialuric acid), uramil (i.e., aminobarbituric acid), dilituric acid (i.e., nitrobarbituric acid), violuric acid (i.e., isonitrosobarbituric acid), pseudouric acid (i.e., ureidobarbituric acid), uracil (i.e., 2,4-dihydroxypyrimidine), thymine (i.e., 5-methyluracil), isocyanuric acid, uric acid (i.e., 2,6,8-trihydroxypurine), alloxanthine, and combinations thereof.

Embodiment 39 is a method for making an air filter, the method comprising: impregnating acidified zeolite with a solution of a urea-based compound to produce a sorbent, the acidified zeolite having a pore opening of 5 Å or greater and a molar ratio of silicate to aluminate of at least 1.1:1; and supporting the impregnated acidified zeolite sorbent on a filter support.

Embodiment 40 is the method of embodiment 39, further comprising acidifying zeolite to produce the acidified zeolite with a proton counterion prior to impregnating the acidified zeolite.

Embodiment 41 is the method of any one of embodiments 39-40, wherein the solution of the urea-based compound comprises at least 5%, at least 7%, at least 9%, at least 10%, or at least 15% of the urea-based compound by weight of the solution.

Embodiment 42 is the method of any one of embodiments 39-41, wherein the solution of the urea-based compound comprises up to 25%, up to 30%, up to 35%, or up to 40% of the urea-based compound by weight of the solution.

Embodiment 43 is the method of any one of embodiments 39-42, wherein the acidified zeolite has a pore opening of 7 Å or greater.

Embodiment 44 is the method of any one of embodiments 39-43, wherein the acidified zeolite has a pore opening of up to 14 Å.

Embodiment 45 is the method of any one of embodiments 39-44, wherein the molar ratio of silicate to aluminate is at least 1.1:1, at least 1.15:1, at least 1.2:1, at least 1.5:1, at least 2:1, or at least 5:1.

Embodiment 46 is the method of any one of embodiments 39-45, wherein the molar ratio of silicate to aluminate is up to 130:1, up to 100:1, up to 80:1, up to 75:1, up to 70:1, or up to 50:1.

Embodiment 47 is the method of any one of embodiments 39-46, wherein the acidified zeolite has a faujasite-type structure.

Embodiment 48 is the method of any one of embodiments 39-47, wherein the acidified zeolite is an X-type zeolite.

Embodiment 49 is the method of any one of embodiments 39-48, wherein the urea-based compound comprises a cyclic urea selected from ethyleneurea (i.e., 2-imidazolidone), hydantoin, allantoin, alloxanic acid, oxazolylurea (i.e., parabanic acid), 5,5-dimethylhydantoin, urazole, malonylurea (i.e., barbituric acid), mesoxalylurea (i.e., alloxan), hydroxymalonylurea (i.e., dialuric acid), uramil (i.e., aminobarbituric acid), dilituric acid (i.e., nitrobarbituric acid), violuric acid (i.e., isonitrosobarbituric acid), pseudouric acid (i.e., ureidobarbituric acid), uracil (i.e., 2,4-dihydroxypyrimidine), thymine (i.e., 5-methyluracil), isocyanuric acid, uric acid (i.e., 2,6,8-trihydroxypurine), alloxanthine, and combinations thereof.

Embodiment 50 is a method of sorbing an aldehyde on the sorbent of any one of embodiments 1-15, the method comprising: contacting the aldehyde with the sorbent, the aldehyde being of Formula (I):

$$R\text{---}(CO)\text{---}H \quad (I)$$

wherein R is hydrogen, alkyl, vinyl, or aryl and wherein the molecular weight of the aldehyde of Formula (I) is no greater than 200 grams/mole.

Embodiment 51 is the method of embodiment 50, wherein the sorbent sorbs an amount of aldehyde in a range of 0.25 to 12 millimoles per gram of the sorbent.

Embodiment 52 is a composition comprising:
a) the sorbent of any one of embodiments 1-15; and
b) an aldehyde sorbed on the sorbent, the aldehyde being of Formula (I):

$$R\text{—}(CO)\text{—}H \qquad (I)$$

wherein R is hydrogen, alkyl, vinyl, or aryl and wherein the molecular weight of the aldehyde of Formula (I) is no greater than 200 grams/mole.

Embodiment 53 is the composition of embodiment 52, wherein the aldehyde is present in a range of 0.25 to 12 millimoles per gram based on weight of the sorbent.

Embodiment 54 is a method of capturing at least some of an aldehyde from air, the method comprising positioning an air filter comprising a filter support and a sorbent so that the sorbent is exposed to the air, the sorbent comprising acidified zeolite impregnated with a urea-based compound, the acidified zeolite having a pore opening of 5 Å or greater and a molar ratio of silicate to aluminate of at least 1.1:1; and sorbing at least some of the aldehyde from the air onto the sorbent, the aldehyde being of Formula (I):

$$R\text{—}(CO)\text{—}H \qquad (I)$$

wherein R is hydrogen, alkyl, vinyl, or aryl and wherein the molecular weight of the aldehyde of Formula (I) is no greater than 200 grams/mole.

Embodiment 55 is the method of embodiment 54, wherein the aldehyde comprises formaldehyde.

Embodiment 56 is the method of any one of embodiments 54-55, wherein the acidified zeolite has a pore opening of 7 Å or greater.

Embodiment 57 is the method of any one of embodiments 54-56, wherein the acidified zeolite has a pore opening of up to 14 Å.

Embodiment 58 is the method of any one of embodiments 54-57, wherein the molar ratio of silicate to aluminate is at least 1.1:1, at least 1.15:1, at least 1.2:1, at least 1.5:1, at least 2:1, or at least 5:1.

Embodiment 59 is the method of any one of embodiments 54-58, wherein the molar ratio of silicate to aluminate is up to 130:1, up to 100:1, up to 80:1, up to 75:1, up to 70:1, or up to 50:1.

Embodiment 60 is the method of any one of embodiments 54-59, wherein the acidified zeolite has a faujasite-type structure.

Embodiment 61 is the method of any one of embodiments 54-60, wherein the acidified zeolite is an X-type zeolite.

Embodiment 62 is the method of any one of embodiments 54-61, wherein the urea-based compound comprises a cyclic urea selected from ethyleneurea (i.e., 2-imidazolidone), hydantoin, allantoin, alloxanic acid, oxazolylurea (i.e., parabanic acid), 5,5-dimethylhydantoin, urazole, malonylurea (i.e., barbituric acid), mesoxalylurea (i.e., alloxan), hydroxymalonylurea (i.e., dialuric acid), uramil (i.e., aminobarbituric acid), dilituric acid (i.e., nitrobarbituric acid), violuric acid (i.e., isonitrosobarbituric acid), pseudouric acid (i.e., ureidobarbituric acid), uracil (i.e., 2,4-dihydroxypyrimidine), thymine (i.e., 5-methyluracil), isocyanuric acid, uric acid (i.e., 2,6,8-trihydroxypurine), alloxanthine, and combinations thereof.

Embodiment 63 is the method of any one of embodiments 54-62, wherein the filter has an initial efficiency of 30% or greater for removing aldehyde from air, wherein the initial efficiency is measured during first 5 minutes of filtration at a concentration of 10 ppm aldehyde and 50% relative humidity.

EXAMPLES

The following examples describe exemplary sorbents according to embodiments of the present disclosure, as well as methods for their making and testing.

Materials

The materials with their sources are as listed in Tables 1A and 1B. Unless otherwise indicated, all materials were purchased from commercial sources and used as received.

TABLE 1A

Materials

| Designation | Description |
|---|---|
| 2-Imidazolidone hemihydrate | 2-Imidazolidone (ethylene urea) hemihydrate obtained from Acres Organics (Geel, Belgium) |
| NH$_4$Cl | Ammonium chloride obtained from Amresco (Solon, OH, USA) |
| Paraformaldehyde | Paraformaldehyde obtained from MilliporeSigma (St. Louis, MO, USA) |
| FSB | Impregnated activated carbon, 30 × 60 mesh, obtained under the trade designation FORMASORB from Calgon Carbon Corp. (Moon Township, PA, USA). |
| C1505 | Impregnated activated carbon, 30 × 60 mesh, obtained under the trade designation CHEMSORB 1505 from Molecular Products Ltd. (Harlow, Essex, UK). |

TABLE 1B

Zeolites

| Designation | SiO$_2$/Al$_2$O$_3$ Mole Ratio | Cation Form | Description |
|---|---|---|---|
| Zeolite Y1 | 30 | Hydrogen | Obtained under the trade designation Zeolite Y CBV 720, Zeolyst International (Conshohocken, PA, USA) |
| Zeolite Y2 | 60 | Hydrogen | Obtained under the trade designation Zeolite Y CBV 760, Zeolyst International |
| Zeolite Y3 | 80 | Hydrogen | Obtained under the trade designation Zeolite Y CBV 780, Zeolyst International |
| Zeolite 13X - sodium | 1.2 | Sodium | MilliporeSigma (St. Louis, MO, USA) |

Filter Efficiency and Capacity Test

The filter efficiency and capacity test can be used to determine the efficiency of a filter to capture an aldehyde (e.g., formaldehyde) and the aldehyde (e.g., formaldehyde) capacity of the filter. Sorbent granules on a netting support with a specified surface area are exposed to air with a known amount of formaldehyde, and the amount of formaldehyde removed from the air is measured.

The filter efficiency test was performed on the filter samples against a challenge of 10 parts per million (ppm, by volume) formaldehyde at 50% relative humidity (RH) and a 24.3 liter per minute (LPM) air flow (1.75 inch (0.04 m) diameter filter).

Formaldehyde was generated by heating a paraformaldehyde solution in a 50% RH air stream. A simple flow-through custom built delivery system was used to deliver a known concentration of formaldehyde to a sample for measurement. Plastic tubing was used throughout the delivery system, with portions downstream of the formaldehyde generation being fluoropolymer tubing.

Formaldehyde was generated by delivering a 0.94 wt. % solution of paraformaldehyde in water using a 25 milliliter (mL) ILS syringe (from Innovative Labor Systeme, Inc., Stutzerbach, Germany). The syringe was driven at a specific rate by a syringe pump (model MA1 55-2222 from Harvard Apparatus, Holliston, Mass., USA). By knowing the paraformaldehyde concentration in solution and the cross-sectional area of the syringe, a precise rate of paraformaldehyde solution could be delivered. The solution was delivered onto a piece of filter paper resting on hot gold foil in a flask which served to decompose the paraformaldehyde and vaporize the resulting formaldehyde. Through the flask, a humidified stream of house compressed air was passed, controlled by a mass flow controller (model P5 Å-29277 from MKS Instruments, Andover, Mass., USA). The air was set to 50% RH by a flask containing heated water and a proportional integral derivative (PID) controller (from 3M Company in St. Paul, Minn., USA). The PID controller adjusted the heat to the water flask in accordance to the target relative humidity. At the start of each test, the mass flow controller was set to deliver a flow rate of 24.3 LPM, calibrated by a flow meter (model 4040 from TSI, Inc. Shoreview, Minn., USA). The evaporation of the formaldehyde served to create a concentration of 10 ppm formaldehyde in the air. It is possible to generate higher and lower formaldehyde concentrations by altering the concentration of the paraformaldehyde solution or adjusting the rate of solution delivery.

The impregnated zeolite sorbent-containing filter (see Filter Preparation Procedure below) was placed in a sample holder. The sample holder with the filter sample was placed in a chamber, where the formaldehyde gas stream was passed through the sample. Downstream of the testing chamber, the tubing was connected to an IR detector (Miran SapphIRe model 250B Series from Thermo Fischer Scientific, Inc., Waltham, Mass., USA), which sampled the effluent from the test chamber. The IR detector was calibrated by sampling the unfiltered formaldehyde gas stream for 40 minutes before each filter sample was added and again for 30 minutes after the filter sample was removed. The detected concentration was then normalized to 10 ppm formaldehyde. At the time the formaldehyde gas stream began to pass through the test sample, the test was considered started, and a timer was started. The concentration of formaldehyde in the effluent being sampled was recorded every 75 seconds. The test was considered completed when 95% breakthrough of the full formaldehyde concentration was observed.

The initial efficiency and the 95% breakthrough capacity was then calculated for each sample. The initial efficiency was calculated by averaging the data points of %-reduction in concentration for the first 5 minutes of the test. The 95% breakthrough capacity was calculated by the total mass of formaldehyde that was filtered out of the stream of air until at least 95% of the full formaldehyde concentration was detected breaking through the sample filter, being averaged every 30 minutes.

The data collected during this test for each air filter/sorbent sample was used to make a plot of formaldehyde capture efficiency as a function of time. From the formaldehyde capture efficiency plot, a total formaldehyde loading capacity at 95% formaldehyde breakthrough was obtained by fitting an exponential curve to the plot using standard fitting methods. The area under the curve was then calculated. The value for the area under the curve was multiplied by the mass flow rate of the formaldehyde and then divided by the sorbent mass on the filter to obtain a mass % uptake of formaldehyde for the sorbent.

A second plot was then made from the first formaldehyde capture efficiency plot with the second plot having the time (x) axis normalized by filter area (per square meter). From this plot, a total formaldehyde loading capacity at 95% formaldehyde breakthrough was obtained by fitting an exponential curve to the plot using standard fitting methods. The area under the curve was calculated and then multiplied by the mass flow rate of the formaldehyde to obtain the filter aldehyde capacity (reported in grams of formaldehyde sorbed per square meter of filter area).

Sorbent Capacity Test

The sorbent aldehyde capacity test involves delivering a known concentration of formaldehyde through a known amount of sorbent (e.g., a packed bed of sorbent granules) and detecting a breakthrough point (1 ppm) when the sorbent is no longer capable of sorbing all of the delivered formaldehyde.

A simple flow-through custom built delivery system was used to deliver known concentrations of formaldehyde to the sample for measurement. Plastic tubing was used throughout the delivery system, with the portions downstream of the formaldehyde generation being fluoropolymer tubing. Formaldehyde was generated by delivering a 6.33 wt. % solution of paraformaldehyde in water using a 2.5 mL GASTIGHT syringe (product number 81420 from Hamilton Company, Reno, Nev., USA). The syringe was driven at a specific rate by a syringe pump (model 780200-V from KD Scientific, Holliston, Mass., USA). By knowing the paraformaldehyde concentration in solution, and the cross-sectional area of the syringe, a precise rate of paraformaldehyde solution could be delivered. This solution was delivered onto a piece of hot gold foil in a flask which served to decompose the paraformaldehyde and vaporize the resulting formaldehyde. Through this flask, 250 mL/minute of nitrogen gas was passed, controlled by an analog mass flow controller (model GFC17 from Aalborg, Orangeburg, N.Y., USA) with a range of 0-500 mL/minute. This controller was calibrated by placing a model 800286 GILIBRATOR soap bubble flow meter with a 20-6000 mL calibration cell (Sensidyne, St. Petersburg, Fla., USA) at the output of the controller. The GILIBRATOR flow meter was used to measure a range of flows from each flow controller that was used to generate calibration curves. The evaporation of the formaldehyde served to create a concentration of 250 ppm formaldehyde in the nitrogen. Water was also evaporated into the nitrogen which humidified the stream to approximately 50% RH. Using these calibration curves, the mass flow controllers were set to deliver the desired formaldehyde concentration and humidity at the desired gas flow rate.

Test material was added to a tared test tube (1.0 cm inner diameter) until the bed depth in the tube was 1.0 cm after being tamped. The mass of the test material was recorded. The test tube was then connected in line with the delivery system allowing the 250 ppm formaldehyde gas stream to flow through the test material. To the downstream side of the test tube, tubing was connected that led to a gas chromatograph instrument (SRI 8610C, SRI Instruments, Torrance, Calif., USA) with a methanizer-equipped flame ionization detector (FID).

At the time the formaldehyde gas stream began to pass through the test sample, the test was considered started, and a timer was started. The gas chromatograph periodically sampled the gas stream, recording the timestamp of every data point taken, and passed the sample through a RT-U-BOND 30 meter column (Restek Corporation, Bellefonte, Pa.). The effluent from the column was then passed through the methanizer and FID. The methanizer served to convert the formaldehyde to methane, which was ionized and detected by the FID. This signal was subsequently reported and recorded in the data acquisition software provided with the device. Good formaldehyde vapor detection occurred when the gas chromatograph sampled the gas stream for 6 seconds, allowed the sample to pass through the column for 144 seconds, and then flushed out the sample of the gas stream for 60 seconds before drawing in the next sample of the gas stream to be analyzed. Prior to testing, different rates of formaldehyde were delivered into the nitrogen gas stream to prepare a calibration curve for the gas chromatograph. In this way, a signal to concentration curve could be made so that any level of signal on the gas chromatograph could be correlated to a concentration of formaldehyde.

The end point of the sorbent aldehyde capacity test was defined as the point corresponding to the time at which the formaldehyde effluent passing through the bed of the test material produced a signal on the FID detector that exceeded the signal corresponding to 1 ppm (the breakthrough point). The performance of each test material was reported as the number of minutes until 1 ppm breakthrough was observed performing the test as described above. In addition, the area under the curve of the breakthrough plot until 1 ppm breakthrough coupled with the known mass of the test material used in this fixed volume test was used to calculate a mmol/g capacity for each test material using a sum of least squares equation.

Elemental Analysis Procedure

Samples were analyzed for weight percent carbon, hydrogen, and nitrogen by combustion using a LECO TruSpec Micro CHNS elemental analyzer (LECO Corp, St. Joseph, Mich., USA). The samples were run in triplicate or greater. Results are reported as the averages of replicate determinations. To eliminate ambient water from the analysis, aliquots of each sample were dried on a steam-plate under nitrogen for 2 hours and allowed to cool in a nitrogen-purged dry-box for 30 minutes before weighing. The LECO TruSpec Micro CHNS instrument was calibrated by first base-lining the instrument with ambient air until the CHNS detectors were stabilized. Next, 3-4 empty crucibles were measured and set as instrument blanks. Finally, a calibration curve was generated with sulfamethazine as a standard. The samples were placed in silver crucibles, crimped, and placed on the auto-sampler in ambient conditions. Based on this procedure the standard deviation for each element was: less than +/−0.5 weight percent for carbon, less than +/−0.3 weight percent for hydrogen, and less than +/−0.3 weight percent for nitrogen.

Filter Preparation Procedure

The filters were prepared by adding a thin layer (approximately 2 millimeters (mm)) of the impregnated zeolite sorbent powder onto a low pressure drop non-woven substrate which was obtained from Berry Plastics (Evansville, Ind.) under the trade designation TYPAR 3251M. The filter support was reported to have a basis weight of 85 grams per meter squared (g/m$^2$). The area of the filter was 0.0016 m$^2$ (1.75 inches (0.04 m) diameter filter). The mass of the sorbent added was determined by weighing the sample before and after loading it onto the TYPAR web. From this information, grams of sorbent on the filter per square meter of filter (g/m$^2$ in Table 2) were calculated. These impregnated zeolite sorbent-containing filters were used in the filter efficiency test method described above.

Preparative Example 1 (PE-1): Acidified Zeolite

In a 2 liter (L) Erlenmeyer flask, a 6 molar (M) aqueous (aq.) ammonium chloride (NH$_4$Cl) solution was prepared by dissolving 320.95 grams (g) NH$_4$Cl in 1000 mL ultra-pure water. 25.0 g of zeolite 13X—sodium was suspended in the 6 M aqueous NH$_4$Cl solution and was allowed to stand in this solution for 48 hours. The zeolite solid was isolated by vacuum filtration and washed three times with 300 mL of ultra-pure water. The resulting solid was dried in a batch oven at 120° C. for 18 hours. The resulting dried zeolite 13X—ammonium material was calcined at 600° C. under a nitrogen atmosphere for 6 hours. The resulting acidified zeolite (zeolite 13X—proton material, PE-1) was used for impregnation studies.

Examples 1 to 4 (EX-1 to EX-4

Impregnated zeolites were prepared using the following procedure. Aqueous impregnation solutions were prepared by dissolving either 5.0, 10.0, or 15.0 g of 2-imidazolidone hemihydrate in 50 mL of deionized water. This produced 9.1, 16.7, and 23.1 weight percent (wt. %) aq. 2-imidazolidone (ethylene urea or "EU") solutions, respectively. 5.0 g of zeolite was suspended in one of the above described 50 mL impregnation solutions. The zeolite was then allowed to stand in the impregnation solution at room temperature with agitation for 18 hours. The zeolite solid was isolated by vacuum filtration without using additional deionized water to transfer or wash the resulting impregnated zeolite. The impregnated zeolite was dried in a batch oven at 120° C. for 18 hours.

A total of 9 impregnated zeolite samples were prepared by impregnating zeolite Y1, zeolite Y2, and zeolite Y3 with 16.7, or 23.1 wt. % aq. EU solutions, and acidified zeolite PE-1 with either 9.1, 16.7, or 23.1 wt. % aq. EU solutions. These impregnated zeolite sorbents were used to prepare filters according to the filter preparation procedure. The prepared filters were subsequently tested using the filter efficiency and capacity test method (Tables 2 and 3).

In addition, the three impregnated acidified zeolite PE-1 samples (EX-4a to EX-4c) and one impregnated zeolite Y3 sample (EX-3b) were also tested using the sorbent capacity test (Table 4).

All nine impregnated zeolite samples were analyzed by elemental analysis using the Elemental Analysis Procedure above. The results from this analysis are summarized in Table 5, where the % by mass nitrogen content of each impregnated zeolite is shown, as well as, the mmol/g and wt. % EU content of each impregnated zeolite sample calculated from the % nitrogen found in each sample.

Comparative Examples 1 and 2 (CE-1 and CE-2

Comparative Example 1 (CE-1) was impregnated activated carbon, 30×60 mesh, obtained under the trade designation FORMASORB (FSB) from Calgon Carbon Corporation, Moon Township, Pa.

Comparative Example 2 (CE-2) was impregnated activated carbon, 30×60 mesh, obtained under the trade designation CHEMSORB 1505 (C1505) from Molecular Products Limited, Harlow, Essex, UK.

TABLE 2

Filter efficiency test results for filter samples with various EU-impregnated Y zeolites and commercial impregnated carbons.

| Example | Zeolite Type | EU Solution Conc., wt. % | Sorbent, g/m² | Formaldehyde Capacity | | Initial Efficiency |
|---|---|---|---|---|---|---|
| | | | | g/m² | % mass | |
| EX-1a | Zeolite Y1 | 16.7 | 638 | 21.5 | 3.4 | 57% |
| EX-1b | Zeolite Y1 | 23.1 | 838 | 19.9 | 2.4 | 49% |
| EX-2a | Zeolite Y2 | 16.7 | 644 | 13.7 | 2.1 | 54% |
| EX-2b | Zeolite Y2 | 23.1 | 606 | 15.9 | 2.6 | 40% |
| EX-3a | Zeolite Y3 | 16.7 | 554 | 16.0 | 2.9 | 55% |
| EX-3b | Zeolite Y3 | 23.1 | 612 | 15.9 | 2.6 | 40% |
| CE-1 | FSB | NA | 275 | 0.6 | 0.2 | 42% |
| CE-2 | C1505 | NA | 272 | 0.6 | 0.2 | 37% |

TABLE 3

Filter efficiency test results for filter samples with EU impregnated acidified zeolite PE-1.

| Example | Zeolite Type | EU Solution Conc., wt. % | Sorbent, g/m² | Formaldehyde Capacity | | Initial Efficiency |
|---|---|---|---|---|---|---|
| | | | | g/m² | % mass | |
| EX-4a | PE-1 | 9.1 | 574 | 11.9 | 2.1 | 85% |
| EX-4b | PE-1 | 16.7 | 538 | 16.5 | 3.1 | 84% |
| EX-4c | PE-1 | 23.1 | 503 | 15.3 | 3.0 | 76% |

TABLE 4

Sorbent capacity test results for various EU impregnated acidified zeolite PE-1 and zeolite Y3 samples.

| Example | Zeolite Type | EU Solution Conc., wt. % | Test Material Mass, g | Minutes Until 1 ppm Breakthrough | Capacity, mmol/g |
|---|---|---|---|---|---|
| EX-4a | PE-1 | 9.1 | 0.6193 | 587 | 2.37 |
| EX-4b | PE-1 | 16.7 | 0.5396 | 691 | 3.20 |
| EX-4c | PE-1 | 23.1 | 0.5764 | 901 | 3.91 |
| EX-3b | Zeolite Y3 | 16.7 | 0.4050 | 121 | 0.75 |

TABLE 5

Elemental analysis results for various EU impregnated acidified zeolite PE-1 and Y zeolite samples.

| Example | Zeolite Type | EU Solution Conc., wt. % | Nitrogen, % by mass | EU, mmol/g | EU, % by mass |
|---|---|---|---|---|---|
| EX-1a | Zeolite Y1 | 16.7 | 5.14 | 1.83 | 15.8 |
| EX-1b | Zeolite Y1 | 23.1 | 9.00 | 3.21 | 27.6 |
| EX-2a | Zeolite Y2 | 16.7 | 7.22 | 2.58 | 22.2 |
| EX-2b | Zeolite Y2 | 23.1 | 8.90 | 3.18 | 27.4 |
| EX-3a | Zeolite Y3 | 16.7 | 7.46 | 2.66 | 22.9 |
| EX-3b | Zeolite Y3 | 23.1 | 8.41 | 3.00 | 25.8 |
| EX-4a | PE-1 | 9.1 | 1.40 | 0.50 | 4.3 |
| EX-4b | PE-1 | 16.7 | 2.43 | 0.87 | 7.5 |
| EX-4c | PE-1 | 23.1 | 3.20 | 1.14 | 9.8 |

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. It should be understood that this disclosure is not intended to be unduly limited by the illustrative embodiments and examples set forth herein and that such examples and embodiments are presented by way of example only with the scope of the disclosure intended to be limited only by the claims set forth here.

What is claimed is:

1. A sorbent comprising:
   acidified zeolite impregnated with a urea-based compound, the acidified zeolite having a pore opening of 5 Å or greater and a molar ratio of $SiO_2$ to $Al_2O_3$ of at least 1.1:1.

2. The sorbent of claim 1, wherein the acidified zeolite has a pore opening of 7 Å to 14 Å.

3. The sorbent of claim 1, wherein the molar ratio of $SiO_2$ to $Al_2O_3$ is from 1.1:1 to 130:1.

4. The sorbent of claim 1, wherein the acidified zeolite has a faujasite-type structure.

5. The sorbent of claim 1, wherein the acidified zeolite is an X-type zeolite.

6. The sorbent of claim 1, wherein the urea-based compound comprises a cyclic urea selected from ethyleneurea, hydantoin, allantoin, alloxanic acid, oxazolylurea, 5,5-dimethylhydantoin, urazole, malonylurea, mesoxalylurea, hydroxymalonylurea, uramil, dilituric acid, violuric acid, pseudouric acid, uracil, thymine, isocyanuric acid, uric acid, and alloxanthine.

7. The sorbent of claim 1, wherein the urea-based compound is ethyleneurea.

8. The sorbent of claim 1, wherein the sorbent comprises 1% to 60% of the urea-based compound by weight of the sorbent.

9. The sorbent of claim 1, wherein the sorbent is prepared by acidifying zeolite to produce acidified zeolite with a proton counterion and impregnating the acidified zeolite with a solution of the urea-based compound.

10. The sorbent of claim 9, wherein the solution of the urea-based compound comprises from 5% to 40% of the urea-based compound by weight of the solution.

11. The sorbent of claim 1, wherein the sorbent has an aldehyde capacity of at least 0.25 mmol/g.

12. A method for making a sorbent, the method comprising:
    impregnating acidified zeolite with a solution of a urea-based compound, the acidified zeolite comprising proton counterions and having a pore opening of 5 Å or greater and a molar ratio of $SiO_2$ to $Al_2O_3$ of at least 1.1:1.

13. An air filter comprising:
    a filter support; and
    the sorbent of claim 1 supported on the filter support.

14. The filter of claim 13, wherein the filter comprises at least 100 g/m² of the sorbent.

15. A method of sorbing an aldehyde on a sorbent of claim 1, the method comprising:
    contacting the aldehyde with the sorbent, the aldehyde being of Formula (I):

R—(CO)—H     (I)

wherein R is hydrogen, alkyl, vinyl, or aryl, and wherein the molecular weight of the aldehyde of Formula (I) is no greater than 200 grams/mole.